(12) United States Patent
Senetar (10) Patent No.: US 8,506,796 B2
(45) Date of Patent: Aug. 13, 2013

(54) FLUID DISTRIBUTION IN RADIAL FLOW REACTORS INCLUDING MOVING BED REACTORS

(75) Inventor: John J. Senetar, Naperville, IL (US)

(73) Assignee: UOP LLC, Des Plaines, IL (US)

(*) Notice: Subject to any disclaimer, the term of this patent is extended or adjusted under 35 U.S.C. 154(b) by 551 days.

(21) Appl. No.: 12/464,335

(22) Filed: May 12, 2009

(65) Prior Publication Data

US 2010/0288676 A1 Nov. 18, 2010

(51) Int. Cl.
*C10G 35/04* (2006.01)
*C07C 5/32* (2006.01)
*B01J 8/02* (2006.01)

(52) U.S. Cl.
USPC .......................... 208/141; 585/654; 422/211

(58) Field of Classification Search
USPC .......................... 208/141; 585/654; 422/211
See application file for complete search history.

(56) References Cited

U.S. PATENT DOCUMENTS 4,276,265 A * 6/1981 Gillespie ..................... 422/218
7,226,568 B1 * 6/2007 Ham et al. .................. 422/218

* cited by examiner

*Primary Examiner* — Randy Boyer
(74) *Attorney, Agent, or Firm* — Arthur E Gooding (57) ABSTRACT

Apparatuses and methods for contacting radially flowing fluids with a solid particulate (e.g., catalyst) with reduced tendency to form fluid jets that impinge on the solid particulate, leading to solid attrition and plugging, are described. Representative particle retention devices for use in these apparatuses and methods have flow channels passing therethrough, from a first surface to an opposing second surface that is adjacent to a particle retention zone. Widths of the flow channels at this opposing second surface will exceed their smallest flow channel widths.

19 Claims, 8 Drawing Sheets

FLUID DISTRIBUTION IN RADIAL FLOW REACTORS INCLUDING MOVING BED REACTORS

FIELD OF THE INVENTION

The present invention relates to the use of particle retention devices such as outer and/or inner screens in radial flow reactors that improve fluid distribution and provide other important advantages, for example with respect to catalyst movement in the case of moving bed reactors.

DESCRIPTION OF RELATED ART

A wide variety of industrial applications involve radial or horizontal flow apparatuses for contacting a fluid with a solid particulate. Representative processes include those used in the refining and petrochemical industries for hydrocarbon conversion, adsorption, and exhaust gas treatment. In reacting a hydrocarbon stream in a radial flow reactor, for example, the feed to be converted is normally at least partially vaporized when it is passed into a solid particulate catalyst bed to bring about the desired reaction. Over time, the catalyst gradually loses its activity, or becomes spent, due to the formation of coke deposits on the catalyst surface resulting from non-selective reactions and contaminants in the feed.

Moving bed reactor systems have therefore been developed for continuously or semi-continuously withdrawing the spent catalyst from the catalyst retention or contacting zone within the reactor and replacing it with fresh catalyst to maintain a required degree of overall catalyst activity. Typical examples are described in U.S. Pat. Nos. 3,647,680, 3,692, 496, and 3,706,536. In addition, U.S. Pat. No. 3,978,150 describes a process in which particles of catalyst for the dehydrogenation of paraffins are moved continuously as a vertical column under gravity flow through one or more reactors having a horizontal flow of reactants. Another hydrocarbon conversion process using a radial flow reactor to contact an at least partially vaporized hydrocarbon reactant stream with a bed of solid catalyst particles is the reforming of naphtha boiling hydrocarbons to produce high octane gasoline. The process typically uses one or more reaction zones with catalyst particles entering the top of a first reactor, moving downwardly as a compact column under gravity flow, and being transported out of the first reactor. In many cases, a second reactor is located either underneath or next to the first reactor, such that catalyst particles move through the second reactor by gravity in the same manner. The catalyst particles may pass through additional reaction zones, normally serially, before being transported to a vessel for regeneration of the catalyst particles by the combustion of coke and other hydrocarbonaceous by-products that have accumulated on the catalyst particle surfaces during reaction.

The reactants in radial flow hydrocarbon conversion processes pass through each reaction zone, containing catalyst, in a substantially horizontal direction in the case of a vertically oriented cylindrical reactor. Often, the catalyst is retained in the annular zone between an outer particle retention device (e.g., an inlet screen) and an inner particle retention device (e.g., an outlet screen) in the forms of outer and inner cylinders, respectively. The devices form a flow path for the catalyst particles moving gradually downward via gravity, until they become spent and must be removed for regeneration. The devices also provide a way to distribute gas or liquid feeds to the catalyst bed and collect products at a common effluent collection zone. In the case of radial fluid flow toward the center of the reactor, for example, this collection zone may be a central, cylindrical space within the inner particle retention device. Regardless of whether the radial fluid flow is toward or away from the center, the passage of vapor is radially through one (outer or inner) retention device, the bed of catalyst particles, and through the second (inner or outer) retention device. Some current state-of-the-art designs for moving catalyst beds utilize screen made of profile wire (or V-shaped wire) to contain the catalyst.

Experience has shown, however, that the horizontal flow of reactants through the bed of catalyst can interfere with the desired downward movement of catalyst particles for spent catalyst removal and regenerated catalyst introduction. Catalyst hang-up or pinning occurs, for example, when horizontally flowing vapor traps catalyst particles against the inner screen boundary of the reactor bed or catalyst retention zone, thereby impeding or preventing the downward movement of the pinned catalyst particles. Specifically, pinning increases frictional forces that counteract gravitational forces acting on the catalyst particles.

In radial flow reactors, pinning can progress from the face of the inner screen, for example, through which reaction products exit, to the outermost portion of the catalyst bed. At this point, a second phenomenon called void blowing begins, referring to the movement of the catalyst particles away from an outer screen, through which radially flowing feed enters the catalyst bed. The existence of the resulting void between the outer screen and an outer catalyst boundary can allow catalyst particles to churn and create catalyst fines. Void blowing can likewise occur in an annular catalyst bed when vapor flows radially outward through the bed and the frictional forces between the catalyst particles exceed the gravitational forces, corresponding to the point at which pinning would occur with radially inward flow.

Both pinning and void blowing can therefore lead to the production of catalyst fines in any type of radial or horizontal flow bed, which in turn increases the pressure drop across the catalyst bed and further exacerbates pinning and void blowing. This can ultimately result in the plugging of fine screen surfaces, greater erosion of the process equipment, and increased material (i.e., catalyst) costs required to operate the process. Additional problems associated with catalyst fines generation are well recognized in the art and described, for example, in U.S. Pat. No. 3,825,116.

In view of these considerations, the effective management of flow distribution and pressure drop in radial flow (e.g., moving bed) reactors and other apparatuses, in which a radially or horizontally moving fluid contacts a particle bed disposed between particle retention devices, provides significant design challenges. Particle retention devices such as screens must have the ability to not only address the drawbacks discussed above, but also satisfactorily contain the individual particles within a zone. There is consequently a need in the art for particle retention devices that offer improved performance in radial flow fluid/solid contacting applications such as hydrocarbon conversion reactors.

SUMMARY OF THE INVENTION

The present invention is directed to apparatuses and methods for contacting radially flowing fluids with a solid particulate that address the issues noted above. These include difficulties encountered industrially with conventional catalyst retention devices, for example profile wire screens in which the individual wires are assembled with the catalyst contacting side having a smaller area (e.g., per unit of axial height) relative to the opposing side that does not contact catalyst. The invention is associated with the recognition that high pressure drop across radial flow reactors, progressing to catalyst plugging and leading to screen damage, is attributed to the formation of fluid jets that directly impinge on the catalyst. Particle retention devices for radial flow contacting apparatuses (e.g., reactors), as described herein, are therefore commercially advantageous in that they reduce or eliminate the induction of high localized fluid velocities, or fluid jets, which detrimentally interact with discreet portions of a dense solid particulate phase such as a downwardly moving catalyst bed.

Embodiments of the invention are directed to particle retention devices, as described herein, having a larger area facing a particle retention zone than the opposing area facing a zone that does not contain solid particulate, such as either a fluid inlet distribution zone or a fluid outlet collection zone. This configuration beneficially increases the area of initial contact (e.g., in the case of an outer screen with inwardly flowing fluid) and/or final contact (e.g., in the case of an inner screen with inwardly flowing fluid) between the radially flowing fluid and solid particulate. The expanded area provided, for fluids entering or exiting these critical areas through flow channels passing in the radial direction through the particle retention devices, thereby reduces the impinging velocity at interfaces between these devices and solid particulate.

In a specific, exemplary embodiment in which profile wire having a triangular cross section is used to form a particle retention device as a cylindrical screen, flat sides of the triangular bases can be aligned to face the spaces or zones that do not contain solid particulate, while protruding sides formed from vertices opposite these bases face a particle retention zone. These protruding sides therefore face inward, or towards the interior of the cylinder, in the case of an outer screen or other outer particle retention device external to or surrounding a particle retention zone, for example used to retain a catalyst. Conversely, the protruding sides can face outward, or towards the exterior of the cylinder, in the case of an inner screen internal to or surrounded by the particle retention zone. Flow channels formed by the profile wire have widths (e.g., measured in the axial direction), at surfaces adjacent to the particle retention zone, that exceed the smallest flow channel widths either (i) at opposing surfaces adjacent to spaces or zones that do not retain solid particulate or (ii) within the flow channels at a given radial location.

Further embodiments of the invention are directed to particle retention devices in which flow channels passing therethrough in the radial direction (e.g., at a given axial position toward or away from the center of a reactor in which one or more of the devices is disposed) are extended circumferentially or around the perimeter of the particle retention zone or other zone having a circular or annular cross section. For example, a representative, cylindrically shaped screen as a particle retention device may have flow channels formed from one or more elongated particle retention elements, such as profile wire having a triangular cross section as described above, in which the wires, as well as the flow channels formed between adjacent wires, extend circumferentially to partially or completely encircle or otherwise surround (e.g., in a partial or complete circular or oval shape) the axis of the cylindrically shaped screen, which may be common with the axis through the reactor (i.e., the screen and reactor may be positioned concentrically). According to other embodiments, a single profile wire or other elongated particle retention element may be wound in a spiral to form the plurality of flow channels, in this case with each complete turn of the spiral being considered a separate flow channel. Such flow channels therefore extend circumferentially but at some angle in the axial direction, corresponding to the pitch of the spiral. The axial pitch may deviate from a constant axial position (e.g., constant horizontal height or plane), for example by less than about 25°, and often less than about 10°.

The use of flow channels widening in the radial direction toward the particle retention zone that they surround (e.g., in the case of an outer screen or other particle retention device) or are surrounded by (e.g., in the case of an inner screen or other particle retention device), may therefore be associated with protrusions (e.g., vertices of triangles of the cross-sectional shape of the profile wire or other circumferentially elongated particle retention element) at a surface of the particle retention device that is opposite a smooth surface. Thus, the area of the particle retention device facing the solid particulate (e.g., catalyst) may be formed from a series of protruding "louvers," for example having dimensions on a small scale that may be commensurate with that of the catalyst particles. This contact area between the particle retention device and particle retention zone is maximized, as it includes, for example, exposed sections of the protrusions such as wire sections and not only the spaces between wires that form flow channels.

Particle retention devices, as described herein, therefore provide improved fluid flow characteristics and also effectively contain a solid particulate such as a catalyst. Additional embodiments of the invention are therefore directed to such particle retention devices, in which profile wire or another type of circumferentially elongated particle retention element is used to form a plurality of flow channels having widths, at a surface adjacent to a particle retention zone, exceeding respective smallest widths, either at the opposing surface or within the flow channels. Further embodiments are directed to radial flow reactors comprising such a particle retention device or devices (e.g., both an outer and an inner screen), and still further embodiments are directed to hydrocarbon conversion processes utilizing the radial flow reactors.

In exemplary processes, a hydrocarbon feed stream is passed, either radially inward or radially outward, through a particle retention device as described herein and into a bed of particulate catalyst retained in the particle retention zone. In such processes, a hydrocarbon product stream may be withdrawn, for example, from the catalyst bed through a cylindrical fluid collection zone at the center of the reactor (e.g., internal to an inner particle retention screen), in the case of an inwardly flowing hydrocarbon feed stream, or otherwise through an annular fluid collection zone at an inner periphery of the reactor (e.g., external to an outer particle retention screen), in the case of an outwardly flowing hydrocarbon feed stream. A representative radial flow process is used to dehydrogenate paraffinic hydrocarbon streams containing a saturated hydrocarbon, or a combination of saturated hydrocarbons, in the $C_3$ to $C_{22}$ carbon number range, to provide a corresponding mono-olefin or combination of mono-olefins. Another representative process is a catalytic reforming process used to increase the octane number of a naphtha petroleum fraction, or a hydrocarbon feed stream comprising hydrocarbons boiling in the range from about 80° C. (180° F.) to about 205° C. (400° F.).

These and other embodiments and aspects relating to the present invention are apparent from the following Detailed Description.

The features referred to in FIGS. 1-10 are not necessarily drawn to scale and should be understood to present an illustration of the invention and/or principles involved. Some features depicted have been enlarged or distorted relative to others, in order to facilitate explanation and understanding. Particle retention devices such as screens, as well as radial flow fluid/solid contacting apparatuses and processes utilizing such apparatuses, as disclosed herein, will have configurations, components, and operating parameters determined, in part, by the intended application and also the environment in which they are used.

DETAILED DESCRIPTION

Aspects of the invention relate to particle retention devices for use in apparatuses for contacting fluids (e.g., gases, liquids, or mixed phase fluids containing both gas and liquid fractions) with solids that are typically in particulate form (e.g., spheres, pellets, granules, etc.). The maximum dimension (e.g., diameter of a sphere or length of a pellet), for an average particle of such particulate solids, is typically in the range from about 0.5 mm (0.02 inches) to about 15 mm (0.59 inches), and often from about 1 mm (0.04 inches) to about 10 mm (0.39 inches). An exemplary solid particulate is a catalyst used to promote a desired hydrocarbon conversion reaction and normally containing a catalytically active metal or combination of metals dispersed on a solid, microporous carrier. Catalysts and other solid particulates are retained in particle retention devices when the smallest widths of the flow channels, for passage of fluid in the radial direction, are less than the smallest dimension (e.g., diameter of a sphere or diameter of the base of a pellet), for an average particle of a particulate solid. Typical smallest or minimum flow channel widths (e.g., formed as gaps or openings between adjacent, spaced apart profile wires or windings of profile wires) are in the range from about 0.3 mm (0.01 inches) to about 5 mm (0.20 inches), and often from about 0.5 mm (0.02 inches) to about 3 mm (0.12 inches). A representative apparatus containing a particle retention device according to the present invention is therefore a radial flow reactor that may be used in a number of chemical reactions including hydrocarbon conversion reactions such as catalytic dehydrogenation and catalytic reforming.

As discussed above, the particle retention devices provide important advantages in terms of their ability to retain solid particulates such as catalysts and also effectively distribute radially or horizontally flowing fluids to these particulates. Although the particle retention devices are described herein primarily with respect to their exemplary use in radial flow reactors, it is understood that such devices are broadly applicable to a wide variety of apparatuses and methods for fluid/solid contacting. Illustrative examples include filtration, selective gas or liquid adsorption (e.g., pressure swing adsorption or the adsorptive separation of liquids), reactive distillation, and others.

Use of the term "particle retention device" is understood to refer to devices that retain, or restrict the flow of, a solid particulate in at least one direction (e.g., radially), but do not necessarily immobilize the solid particulate. In fact, contemplated applications of the particle retention devices include their use in radial flow reactors in which the solid particulate, often a catalyst used to promote a desired conversion, is in a moving bed that allows the catalyst to be intermittently or continuously withdrawn (e.g., for regeneration by burning accumulated coke) and replaced in order to maintain a desired level of catalytic activity in the reactor. Therefore, the particle retention device may, for example, confine the catalyst in the radial direction (e.g., from the center of the reactor to an outer radius of a cylindrical retention zone or otherwise between an inner radius and an outer radius of an annular retention zone) but still allow the catalyst to move axially in the downward direction.

Representative embodiments of the invention are directed to radial flow reactors, including moving bed reactors, comprising a vessel and a particle retention device, as described herein, that is disposed in the vessel to promote the desired fluid/solid particulate contacting. In many cases, the vessel and particle retention device will be cylindrical, with the vessel and particle retention device being positioned concentrically, and often with their common axes extending vertically. Other vessel geometries for the vessel and/or particle retention device, for example conical, or cylindrical with one or more conical ends, are possible. The particle retention devices may also be used in reactors having cross-sectional shapes that are not circular, for example elliptical or polygonal. Normally, the cross-sectional shapes of the vessel and particle retention device will be the same (although smaller in size in the case of the particle retention device) at any common axial position within the vessel, in order to promote radial flow uniformity.

The particle retention device may be, according to some embodiments, an "outer particle retention device" that is external to a central particle retention zone. In other embodiments, the particle retention zone may be an "inner particle retention device" that is external to a central space or zone within the reactor, for example used to distribute fluid after entering the reactor and prior to contacting a solid catalyst or collect fluid prior to exiting the reactor and after contacting the catalyst. In many cases, both external and internal particle retention devices may be used to retain a solid particulate such as a catalyst within an annular space between the devices.

If only a single particle retention device as described herein is employed, the choice of an outer particle retention device or an inner particle retention device will often depend on the whether the radial or horizontal fluid flow to the catalyst or other solid particulate is directed toward or away from the central axis of the cylindrical vessel of the reactor or other contacting apparatus. If the fluid flow is toward the central axis, it will normally be desired to use at least an outer particle retention device, while at least an inner particle retention device is usually more appropriate in the case of fluid flow away from the central axis. In this manner, the radial fluid flow entering the bed of catalyst or other solid particulate will first pass through flow channels of the particle retention device as described herein for effective (i) fluid distribution of the inlet fluid (e.g., a hydrocarbon-containing feed stream) and (ii) reduction in the propensity for this inlet fluid to form fluid jets with high localized velocities that impinge on the catalyst or other solid particulate.

As discussed above, however, the use of both outer and inner particle retention devices can be advantageous for not only distributing the inlet fluid such as a hydrocarbon-containing feed stream to, but also for collecting the outlet fluid such as a hydrocarbon-containing product stream as it exits the particle retention zone from, the particle retention zone. Particle retention devices described herein can also be combined with conventional screens, for example, in the case of radial fluid flow toward the central axis of the vessel, an outer particle retention device as described herein may be used to effectively distribute the inlet fluid feed, and a conventional inner screen may be used to collect outlet fluid product, whereby solid particulate is retained in an annular particle retention zone between the outer particle retention device and the screen.

Advantageously, representative particle retention devices have flow channels passing therethrough, in an axial direction from a first surface to an opposing second surface. If the opposing second surface is the surface adjacent to the particle retention zone, then the widths of the flow channels (e.g., measured in the axial direction) at this opposing second surface will exceed their smallest flow channel widths. The smallest or minimum widths may, in many cases, be at the first surface (e.g., the surface through which inlet fluid enters the flow channels), but may also be within the flow channels themselves.

In this manner, a larger area facing the particle retention zone is provided, compared to an area facing a zone that does not contain solid particulate (e.g., a fluid collection zone or a fluid distribution zone), which, depending on the radial direction of fluid flow, may be a central zone about the central axis of the vessel of the fluid/solid contacting apparatus or otherwise may be a peripheral, annular zone between the vessel wall and the outer particle retention device. The larger area facing the particle retention zone provides advantages as discussed above in terms of the reduction of pressure drop/plugging caused by the formation of fluid jets that impinge on the solid particulate. Also, as discussed above, the flow channels having these characteristics can provide radially extending and axially spaced apart protrusions (e.g., vertices of triangles of a triangular cross-sectional shape of a profile wire).

Figure 1:
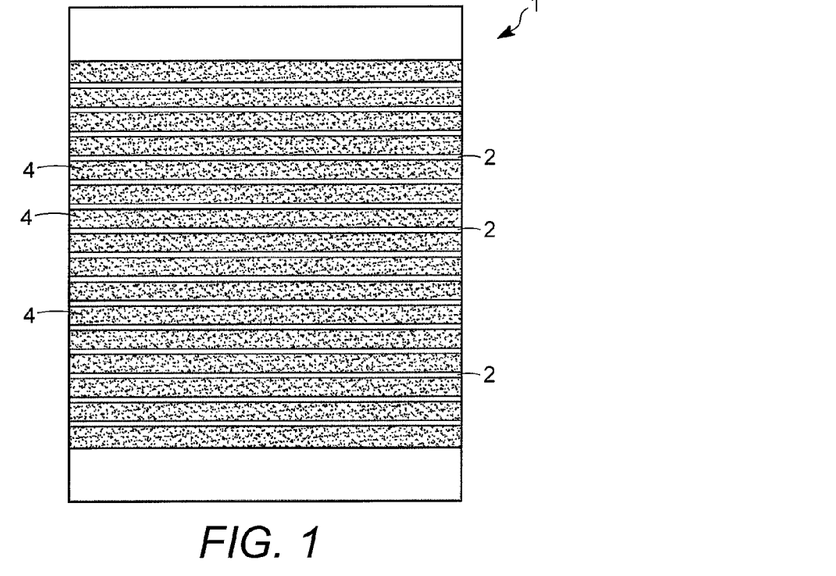
FIG. 1 is a front view of a representative profile wire screen, in which flow channels are formed between adjacent, spaced apart profile wires.

FIG. 1 is a front view of a representative, particle retention device 1 having a cylindrical shape that may be positioned, for example concentrically, within a radial flow reactor having an outer, cylindrical vessel (not shown). A plurality of flow channels 2 are formed on a first, outer surface as gaps between a plurality of elongated particle retention elements 4 that are spaced apart along the axial length of the cylinder, which may correspond to the axial length of the vessel in which the particle retention device 1 is disposed. As shown in FIG. 1, the flow channels 2 have constant widths at this outer surface and are spaced apart at constant intervals. Both the elongated particle retention elements 4 and flow channels 2 formed between them extend circumferentially in circular shapes at constant axial positions and spaced apart in the axial direction, with these shapes corresponding to the circular cross section of the cylinder. It is possible for the circumferentially elongated particle retention elements 4 to extend about the perimeter, or at least part of the perimeter, of other shapes, for example ovals or polygons, defining a radial boundary of an adjacent particle retention zone. Inlet fluid from the exterior of particle retention device 1 is therefore directed in a radial or horizontal flow direction through the flow channels 2, passing from the outer surface to an inner surface.

Figure 1A:
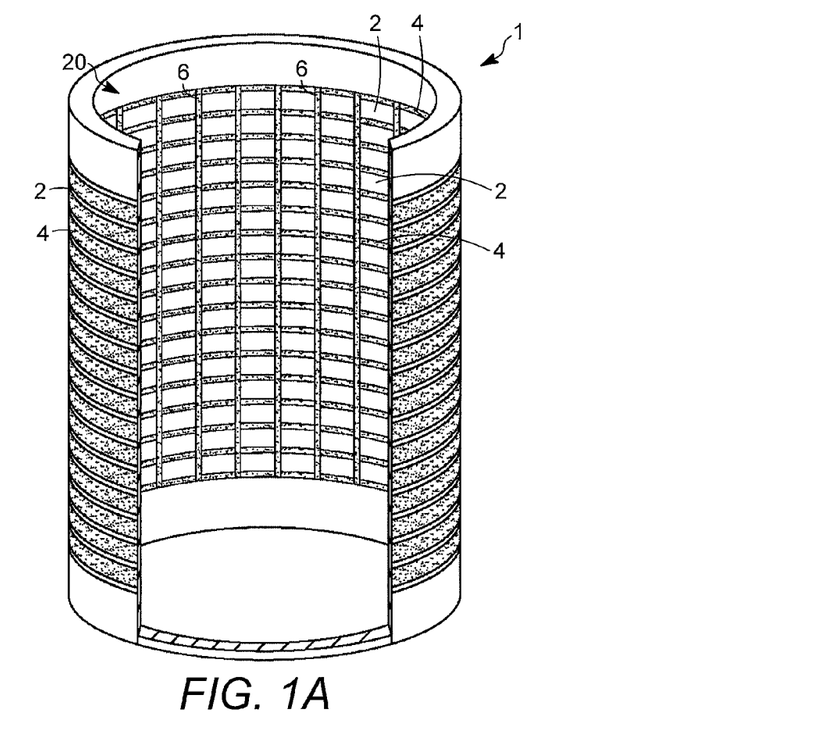
FIG. 1A is a cutout view of the profile wire screen of FIG. 1.
Figure 2:
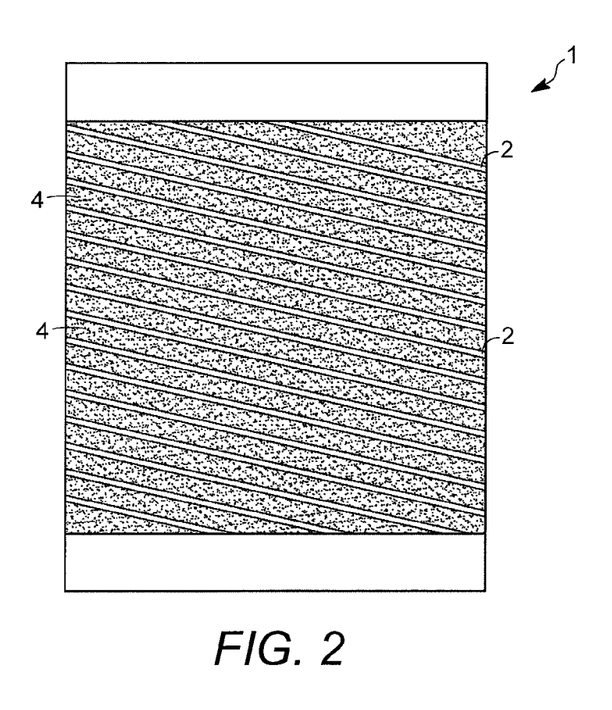
FIG. 2 is a front view of a representative profile wire screen, in which flow channels are formed between adjacent, spaced apart windings of a spiral wound profile wire.

A representative type of circumferentially elongated particle retention element 4 used for particle retention device 1 is profile wire, which is better illustrated in the cutout view of FIG. 1A. Profile wire screen is often fabricated with the wires surrounding, and welded to, a cage of longitudinal support rods 6. The profile wire, as a type of circumferentially extending particle retention element 4, extends about the perimeter (circumference) of a circle defining a radial boundary of particle retention zone 20 in the interior of particle retention device 1. FIG. 2 depicts an alternative embodiment in which a single elongated particle retention element 4 such as profile wire is wound is a spiral shape, and flow channels 2 are formed between adjacent, spaced apart windings. In this embodiment, a flow channel 2 is effectively formed between each complete turn of the windings to effectively provide the equivalent of multiple flow channels 2, although actually only a single flow channel extends in the spiral shape. The flow channels 2 formed in this embodiment are not horizontal as in the embodiment of FIG. 1, but are instead somewhat pitched in the axial direction, with a degree of pitch as discussed above, due to the axial pitch of the spiral.

Figure 3:
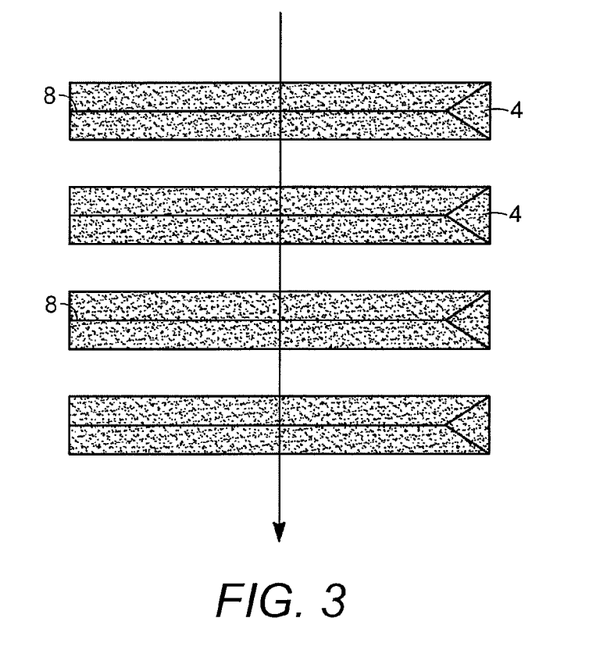
FIG. 3 is a close-up front view of part of a surface of a profile wire screen of FIG. 1 or FIG. 2, illustrating the axial direction of movement of catalyst along this surface.

FIG. 3 more clearly shows part of the inner surface of the particle retention device 1, as depicted in either FIGS. 1 or 2. In the case of this particle retention device 1 being used as an outer particle retention device that is external to a particle retention zone, this inner surface (facing the interior of the cylinder) that is adjacent to the particle retention zone can be defined by protrusions 8 such as vertices of triangles of the triangular cross-sectional shapes of profile wire used as an elongated particle retention element 4. These protrusions 8 provide a larger area facing the particle retention zone 20 relative to an area facing a zone on the opposing side that does not retain solid particles. The elongated particle retention elements 4, flow channels 2 formed between them, and protrusions 8 all extend circumferentially, and optionally with a pitch in the axial direction, in the case of a spiral wound, elongated particle retention element 4, as discussed above. If the particle retention device is disposed within a moving bed reactor, movement of the solid catalyst is normally axially downward and perpendicular to the radial fluid flow and circumferentially extending particle retention element 4, as indicated by the arrow in FIG. 3. Moving catalyst proceeds downward through the particle retention zone and out of the reactor, often to a regenerator used to restore its activity.

Figure 4:
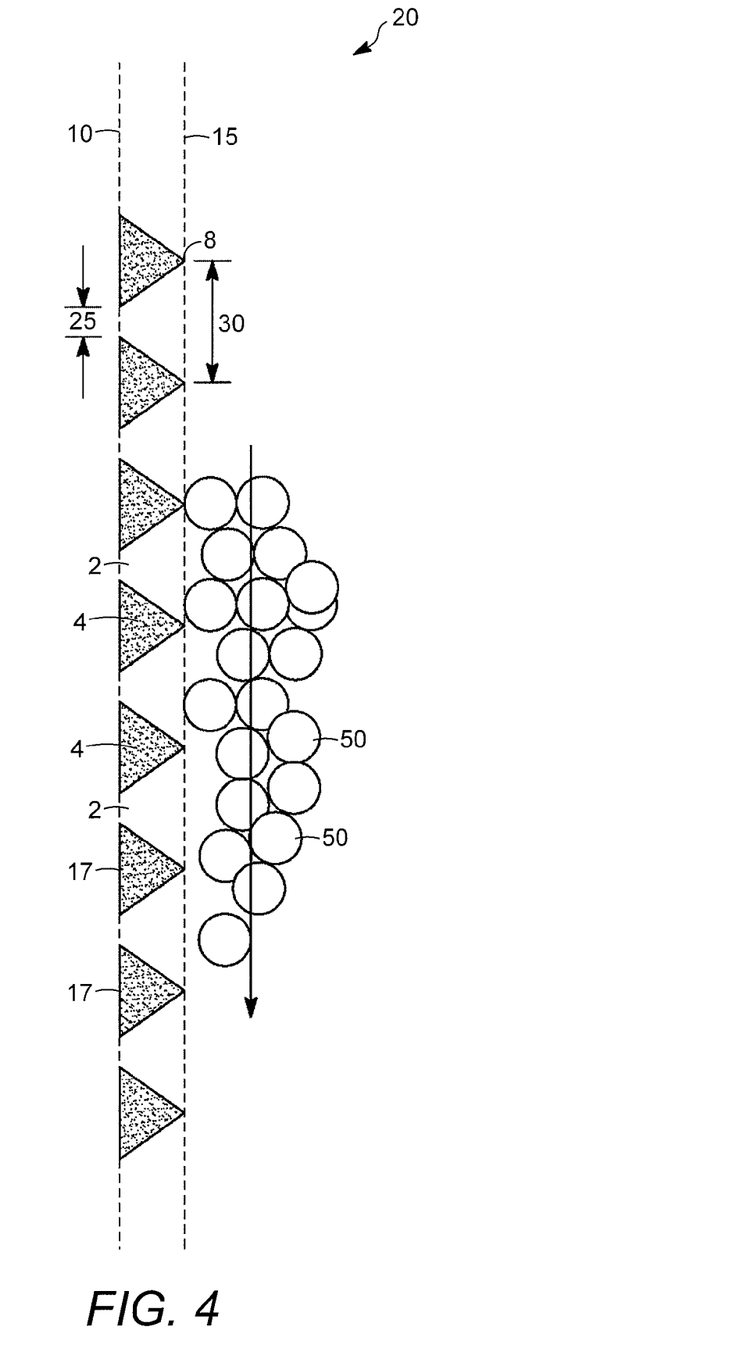
FIG. 4 is a close-up cross-sectional view of part of the opposing surfaces of a profile wire screen of FIG. 1 or FIG. 2, illustrating the axial direction of movement of catalyst.

FIG. 4 provides a cross-sectional side view illustrating how the elongated particle retention elements 4, in this case profile wire having a triangular cross section, form flow channels 2 passing from a first surface 10 to an opposing second surface 15 that is adjacent to the particle retention zone 20. Particles 50 in particle retention zone 20 are shown being adjacent to a portion of this opposing second surface 15, and an arrow in FIG. 4 illustrates a downward axial movement of particles 50 through this zone 20. Again, as discussed above with respect to FIG. 3, protrusions 8 define opposing second surface 15 and provide an expanded area facing particle retention zone 20. Also, fluid openings of flow channels 2, formed by circumferentially elongated particle retention elements 4, have widths 30 (e.g., measured in the axial direction) at opposing second surface 15 that exceed the smallest widths 25 of the flow channels 2. In the embodiment illustrated in FIG. 4, these smallest widths 25 are at first surface 10.

Figure 5:
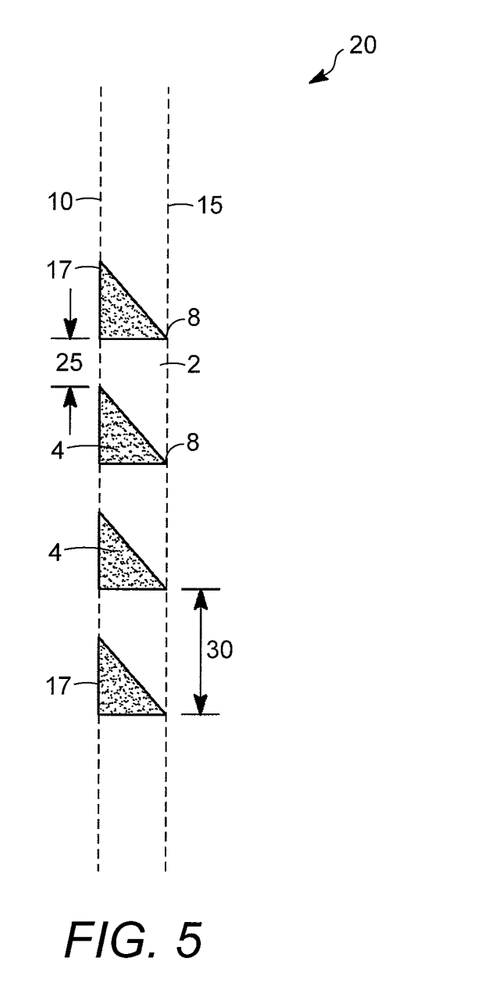
FIG. 5 is a close-up cross-sectional view of part of the opposing surfaces of a profile wire screen formed from profile wires having the cross-sectional shape of a right triangle.

FIG. 5 illustrates a different cross-sectional geometry of elongated particle retention elements 4 that provide flow channels 2. In particular, right triangular cross sections of elongated particle retention elements 4 in FIG. 5, provide flow channels having widths 30 at opposing second surface 15 that exceed smallest widths 25 at first surface 10, as also illustrated in FIG. 4. Additionally, flow channels 2 in both FIGS. 4 and 5 have constantly increasing widths, in the radial direction toward the particle retention zone 20, from the first surface 10 to opposing second surface 15. The somewhat different cross-sectional geometry of elongated particle retention elements 4 in FIG. 5, however, is such that protrusions 8 help form small louver-type structures that guide downwardly moving particles through particle retention zone 20. Despite the different cross-sectional geometries of elongated particle retention elements 4, the particle retention devices in FIGS. 4 and 5 both comprise flow channels 2 formed from elongated particle retention elements 4 having triangular cross sections. Triangular bases 17 define first, smooth surface 10 and opposing vertices, which are protrusions 8, define the opposing second, ridged surface 15.

Figure 6:
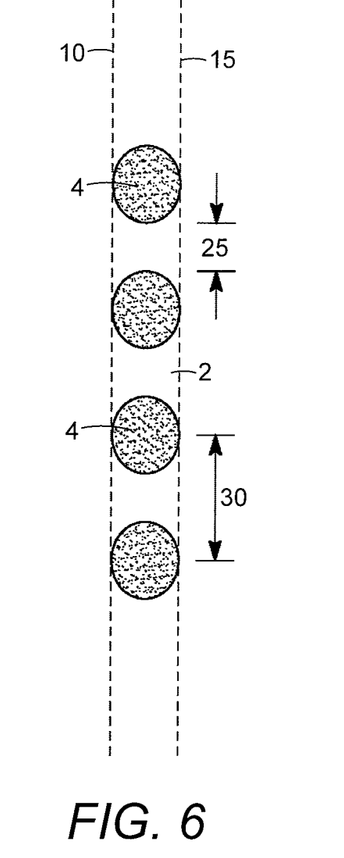
FIG. 6 is a close-up cross-sectional view of part of the opposing surfaces of a profile wire screen formed from profile wires having the cross-sectional shape of an oval.

FIG. 6 illustrates yet another cross-sectional geometry of elongated particle retention elements 4, namely circular or elliptical. In this case, smallest widths 25 of flow channels 2 are at a radial position within these channels, for example at a midpoint within the flow channels, between first surface 10 and opposing second surface 15. In the embodiment shown in FIG. 6, widths 30 of flow channels at opposing second surface 15 are substantially the same as widths at first surface 10.

Figure 7:
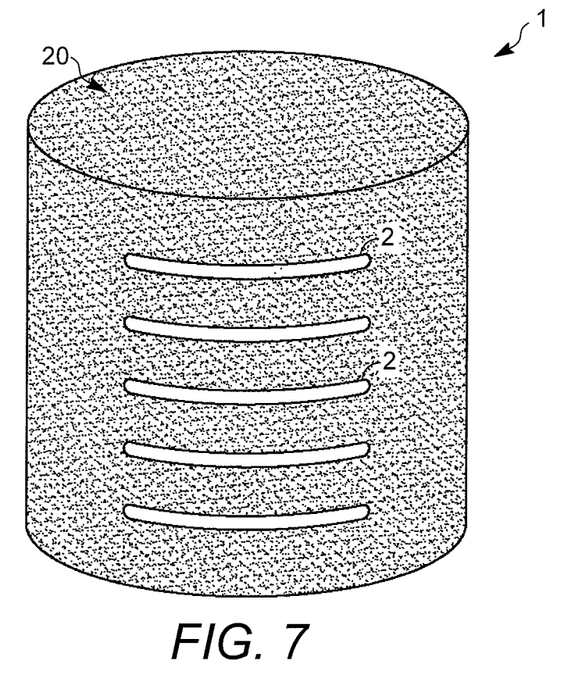
FIG. 7 is a front view of an alternative particle retention device having slots as openings on the outer surface.
Figure 7A:
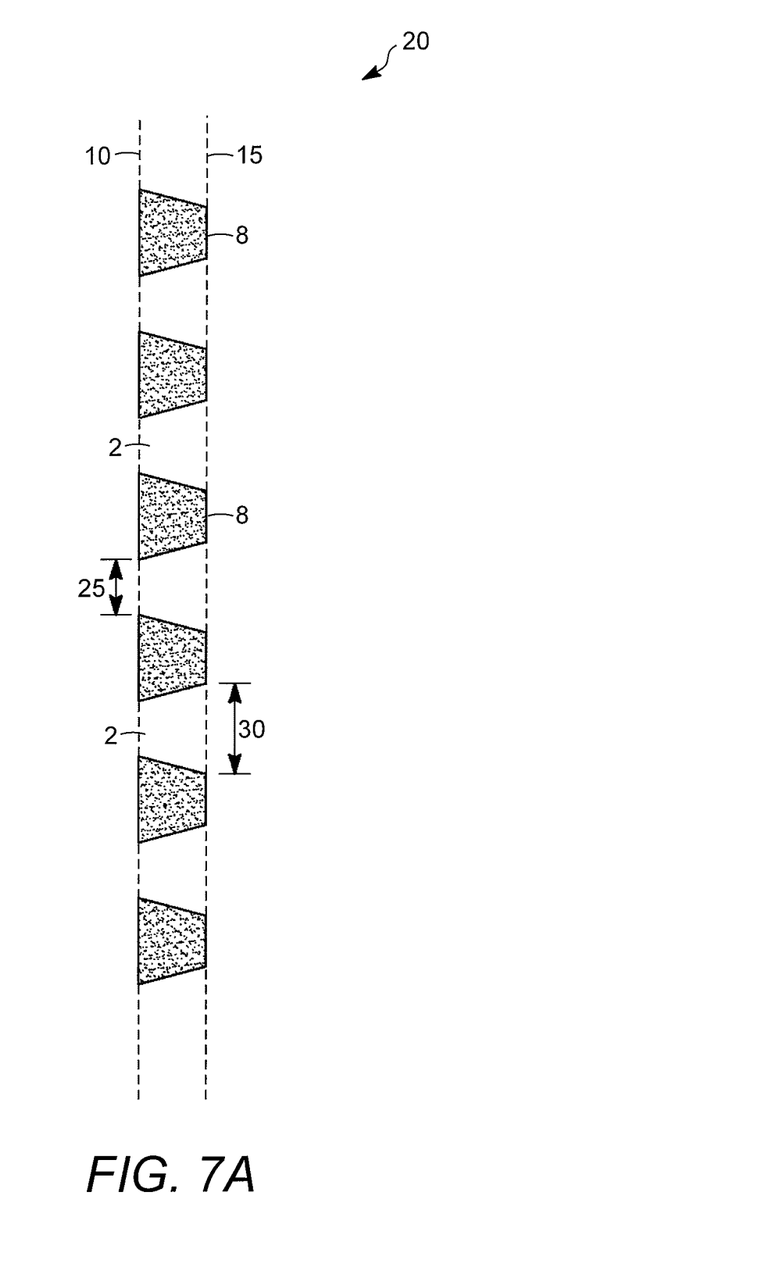
FIG. 7A is a cross-sectional view of opposing surfaces of the particle retention device of FIG. 7.

FIGS. 7 and 7A illustrate front and cross-sectional profile views of an alternative particle retention device 1 in which flow channels 2 extend circumferentially, but only partially around particle retention zone 20, interior to the particle retention device 1. In particular, fluid openings at first surface 10 are in the form of slots that are circumferentially elongated but do not form complete circles as illustrated, for example, in FIG. 1. A plurality of protrusions 8, namely trapezoidal bases as shown in FIG. 7A, define opposing second surface 15 adjacent to particle retention zone 20, such that flow channels 2 formed between radially extending protrusions 8 widen in the axial direction toward the particle retention zone. Widths 30 of flow channels at the opposing second surface are the largest widths, whereas smallest widths 25 are at first surface 10. In an alternative embodiment, the slots shown in FIG. 7 can be replaced by a series of discreet holes in a circumferentially extending row or area, with the holes widening in the axial direction inward to the particle retention zone 20.

Figure 8:
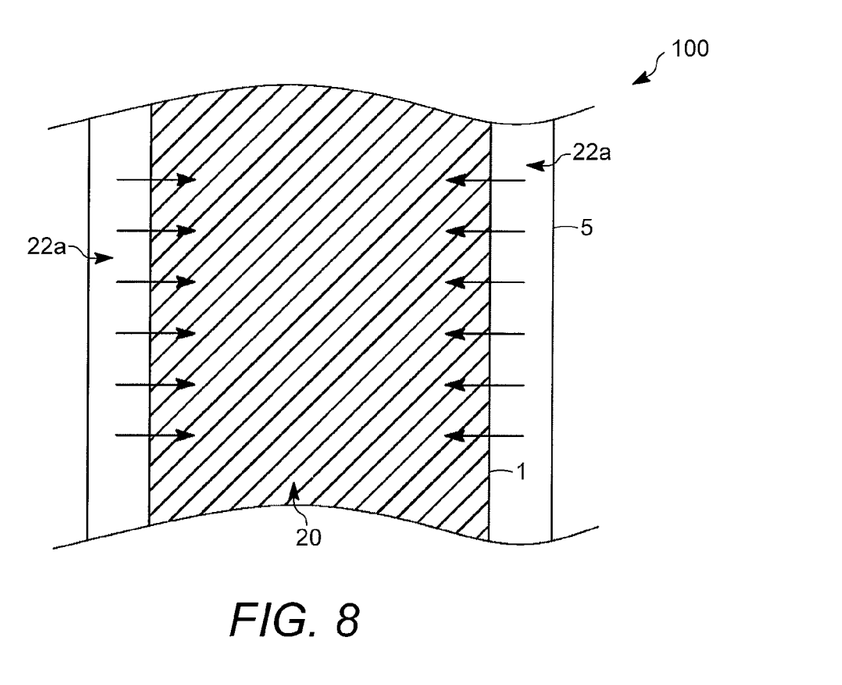
FIG. 8 is a cross-sectional profile of a radial flow reactor with inward radial fluid flow and having an outer particle retention device disposed therein and external to a particle retention zone.
Figure 9:
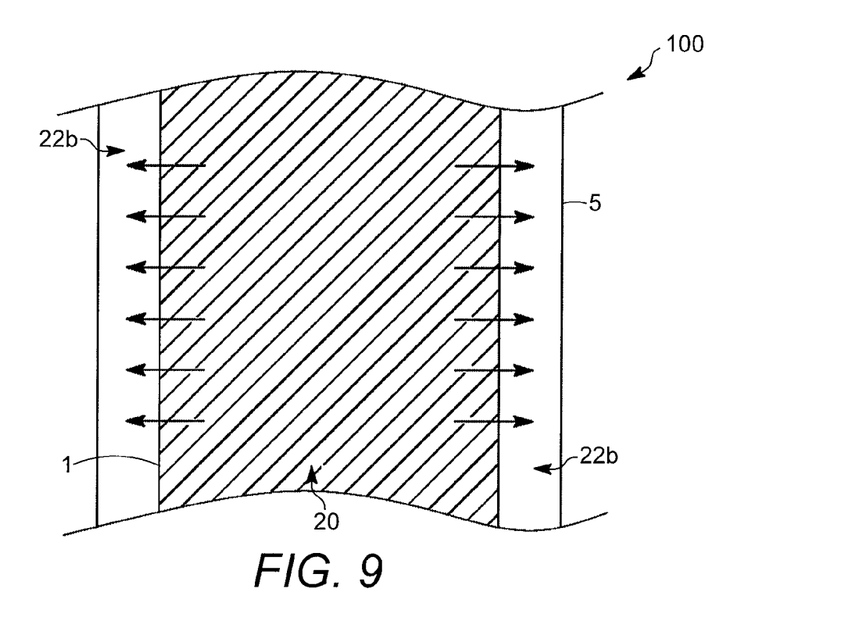
FIG. 9 is a cross-sectional profile of the radial flow reactor and outer particle retention device of FIG. 8, but illustrating outward radial fluid flow.

FIG. 8 is a cross-sectional view of a radial flow reactor 100 comprising a cylindrical vessel 5 and a particle retention device 1, as described herein, being disposed concentrically in the reactor 100, such that the axes of cylindrical vessel 5 and cylindrically shaped particle retention device 1 are aligned. As shown in FIG. 8, particle retention device 1 is an outer particle retention device that is external to particle retention zone 20. The annular space between cylindrical vessel 5 and particle retention device 1 may be a fluid distribution zone 22a, in the case in which fluid flows radially from the outer to the inner surface of particle retention device 1, toward the center of reactor 100, as shown in FIG. 8. Alternatively, when the radial fluid flow is in the opposite direction, as shown in FIG. 9, this annular space may be a fluid collection zone 22b, used, for example, to recover fluid reaction products exiting particle retention zone 20 through particle retention device 1.

Figure 10:
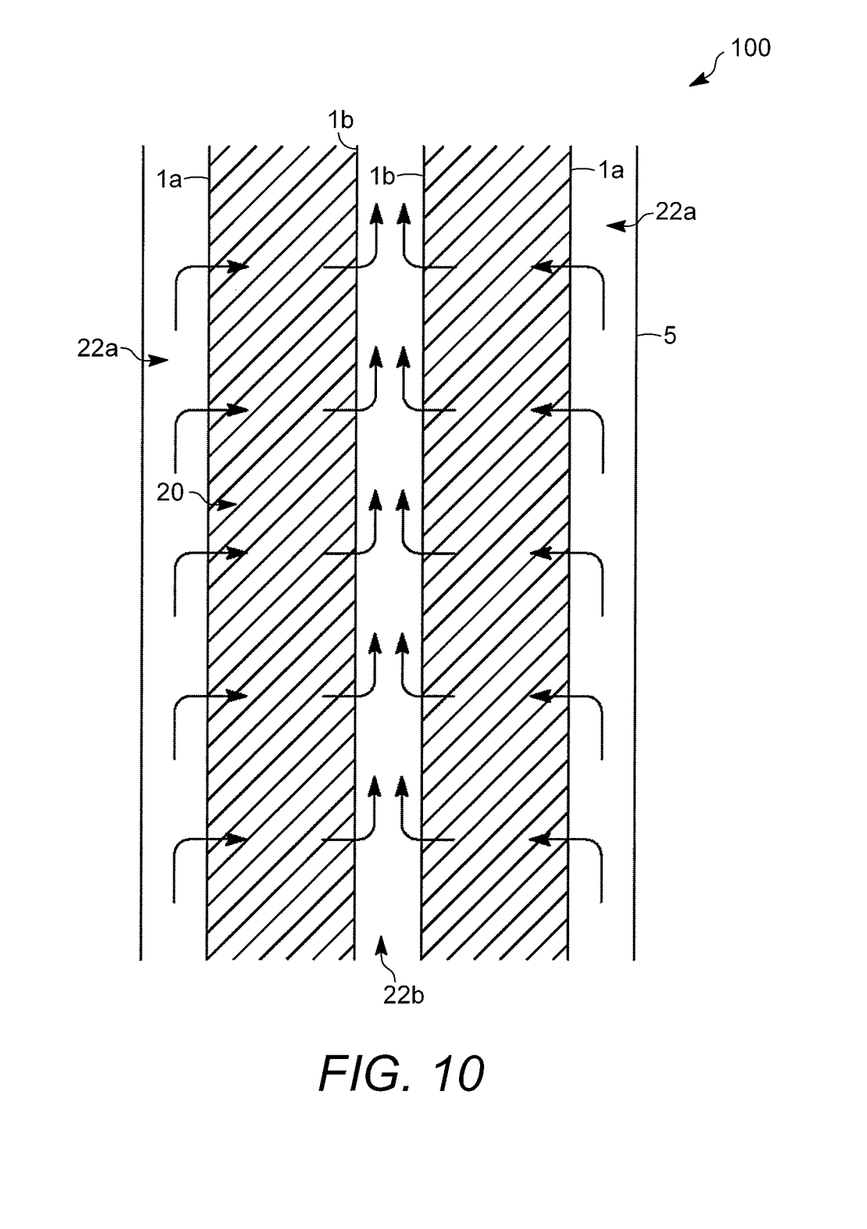
FIG. 10 is a cross-sectional profile of a radial flow reactor with inward radial flow and having both outer and inner particle retention devices disposed therein and an annular catalyst bed between the devices.

FIG. 10 illustrates the use of both outer particle retention device 1a and inner particle retention device 1b, both disposed in radial flow reactor 100 such that cylindrical vessel 5 and cylindrical particle retention devices 1a, 1b, all oriented vertically as shown, are all disposed concentrically with respect to each other. Particle retention zone 20 in this case is an annular zone between inner and outer particle retention devices 1a, 1b. The annular space external to the outer particle retention device 1a and the cylindrical vessel 5 may, as discussed above, be a fluid distribution zone 22a in the case of fluid flowing inwardly as shown by arrows in FIG. 10, or, alternatively, may be a fluid collection zone in the case of fluid flowing radially in the opposite direction. Conversely, the central space, in the fluid flow configuration shown in FIG. 10 may be a central fluid collection zone 22b for recovering fluid exiting the particle retention zone 20 through inner particle retention device 1b or may be a central fluid distribution zone in the case of radial fluid flow in the opposite direction. Flow arrows in FIG. 10 illustrate radial fluid flow through inner and outer particle retention devices 1a, 1b, and also through annular particle retention zone 20, but an overall upward flow of feed distributed to, and product collected from, the particle retention zone 20.

Regardless of the direction of radial fluid flow, at least one of the outer and inner particle retention devices 1a, 1b will have flow channels widening in the axial direction towards the particle retention zone 20, as discussed above. For example, inner particle retention device 1b, according to the invention, may be external to fluid collection zone 22b and comprise a plurality of inner device flow channels passing radially from inner device first surface to inner device opposing second surface adjacent to particle retention zone 20. Fluid openings of flow channels of the inner particle retention device 1b at the first surface may have widths exceeding smallest inner device flow channel widths at the opposing second surface or within the flow channels (e.g., the flow channels may widen, in this case, in the opposite direction as the normal radial fluid flow). In either or both of the outer or inner particle retention devices 1a, 1b, axially spaced apart protrusions, extending radially toward the particle retention zone, may define the surface adjacent to the particle retention zone. The flow channels, having smallest widths at the opposing surface (not adjacent to the particle retention zone) or within the flow channels, may be formed between these protrusions.

Overall, aspects of the invention are associated with particle retention devices for use in radial flow reactors. Representative devices have a smooth first surface and an opposing second surface defined by protrusions extending radially and spaced apart axially. Flow channels from the first surface to the opposing second surface have smallest widths at the first surface or within the flow channels. Those having skill in the art, with the knowledge gained from the present disclosure, will recognize that various changes could be made in the above devices, as well as radial flow fluid/solid contacting apparatuses and processes utilizing these devices, without departing from the scope of the present disclosure.

The invention claimed is:

1. An apparatus for fluid/solid contacting comprising:
   (a) a vessel; and
   (b) a particle retention device disposed in the vessel and comprising a plurality of flow channels passing from a first surface to an opposing second surface adjacent to a particle retention zone, wherein fluid openings of the flow channels at the opposing second surface have widths exceeding smallest flow channel widths at the first surface or within the flow channels, and wherein the flow channels are formed from neighboring particle retention elements, and wherein the particle retention elements have a surface area at the first surface greater than the surface area of the surface area of the particle retention elements at the opposing second surface.

2. The apparatus of claim 1, wherein the particle retention device is an outer particle retention device that is external to the particle retention zone.

3. The apparatus of claim 1, wherein the particle retention device is an inner particle retention device that is external to a central fluid collection zone or a central fluid distribution zone.

4. The apparatus of claim 2, further comprising:
   (c) an inner particle retention device disposed within the vessel, wherein the particle retention zone is between the inner and outer particle retention devices.

5. The apparatus of claim 4, wherein the vessel, the outer particle retention device, and the inner particle retention device are cylindrical and disposed concentrically.

6. The apparatus of claim 5, wherein the vessel, the outer particle retention device, and the inner particle retention device are oriented vertically.

7. The apparatus of claim 4, wherein the inner particle retention device is external to a central fluid collection zone or a central fluid distribution zone and comprises a plurality of inner device flow channels passing radially from an inner device first surface to an inner device opposing second surface adjacent to the particle retention zone, wherein inner device fluid openings of the inner device flow channels at the inner device first surface have widths exceeding smallest inner device flow channel widths at the inner device fluid opposing second surface or within the inner device flow channels.

8. The apparatus of claim 1, wherein the plurality of flow channels are axially spaced apart.

9. The apparatus of claim 2, wherein the plurality of flow channels are formed from one or a plurality of elongated particle retention elements of the outer particle retention device.

10. The apparatus of claim 9, wherein the plurality of flow channels are formed between adjacent, spaced apart elongated particle retention elements or between adjacent, spaced apart windings of an elongated particle retention element.

11. The apparatus of claim 9, wherein the one or plurality of elongated particle retention elements extends circumferentially in a circular or oval shape.

12. The apparatus of claim 1, wherein the smallest flow channel widths are at the first surface.

13. The apparatus of claim 12, wherein the flow channel widths increase constantly in the radial direction from the first surface to the second opposing surface.

14. The apparatus of claim 13, wherein the elongated particle retention elements have triangular cross sections with triangular bases defining the first surface and opposing vertices defining the opposing second surface.

15. The apparatus of claim 1, wherein the smallest flow channel widths are within the flow channels.

16. The apparatus of claim 1, wherein a plurality of protrusions define the opposing second surface of the particle retention device adjacent to the particle retention zone, wherein the protrusions extend radially and are spaced apart axially, and wherein the plurality of flow channels are formed between the plurality of protrusions.

17. A process for converting a hydrocarbon-containing feed stream comprising passing the feed stream radially through the plurality of flow channels of the particle retention device of the apparatus of claim 1, and into a bed of particulate catalyst in the particle retention zone.

18. The process of claim 17, wherein the hydrocarbon-containing feed stream comprises a paraffinic hydrocarbon having from 3 to 22 carbon atoms, and wherein the process is a catalytic dehydrogenation process.

19. The process of claim 17, wherein the hydrocarbon-containing feed stream comprises a naphtha petroleum fraction and wherein the process is a catalytic reforming process.

* * * * *